United States Patent [19]
Frankl et al.

[11] Patent Number: 5,641,891
[45] Date of Patent: Jun. 24, 1997

[54] METHOD FOR SETTING AND CHECKING THE FLOW IN VALVES

[75] Inventors: Herbert Frankl, Straubing; Christian Ludwig, Simbach; Rudolf Raith, Bogen, all of Germany

[73] Assignee: Sonplas GmbH, Straubing, Germany

[21] Appl. No.: 526,784

[22] Filed: Sep. 11, 1995

[30] Foreign Application Priority Data

Sep. 20, 1994 [DE] Germany ............ 44 33 543.1

[51] Int. Cl.⁶ ............................................ F16K 37/00
[52] U.S. Cl. ............ 73/1.72; 73/119 A; 73/118.2; 73/49.7
[58] Field of Search .................. 73/3, 4 R, 168, 73/865.9, 37, 119 A, 118.2, 49.7

[56] References Cited

U.S. PATENT DOCUMENTS

| | | | |
|---|---|---|---|
| 5,157,967 | 10/1992 | Wiecayek | 73/119 A |
| 5,365,769 | 11/1994 | Ferry | 73/4 R |
| 5,373,454 | 12/1994 | Kanda et al. | 73/37 X |
| 5,377,538 | 1/1995 | Cardinal | 73/49.7 X |
| 5,408,872 | 4/1995 | Nonake | 73/118.2 |
| 5,445,019 | 8/1995 | Glidewell et al. | 73/119 A |
| 5,449,527 | 9/1995 | Kuehn et al. | 73/4 R |

FOREIGN PATENT DOCUMENTS

| | | |
|---|---|---|
| 0509455A1 | 10/1992 | European Pat. Off. |
| 3328044A1 | 3/1984 | Germany. |
| 3723698A1 | 1/1989 | Germany. |
| 4123787A1 | 1/1993 | Germany. |

*Primary Examiner*—Thomas P. Noland
*Attorney, Agent, or Firm*—Keck, Mahin & Cate

[57] ABSTRACT

Method for setting and/or checking the flow or through-flow in valves, particularly injection valves for internal combustion engines. The injection valve is placed in a measuring device and subject to the action of a fluid. The fluid is passed through the valve at a given volume flow. The pressure set in the measuring device is determined and serves as a measure for the setting and/or checking of the injection valve.

34 Claims, 1 Drawing Sheet

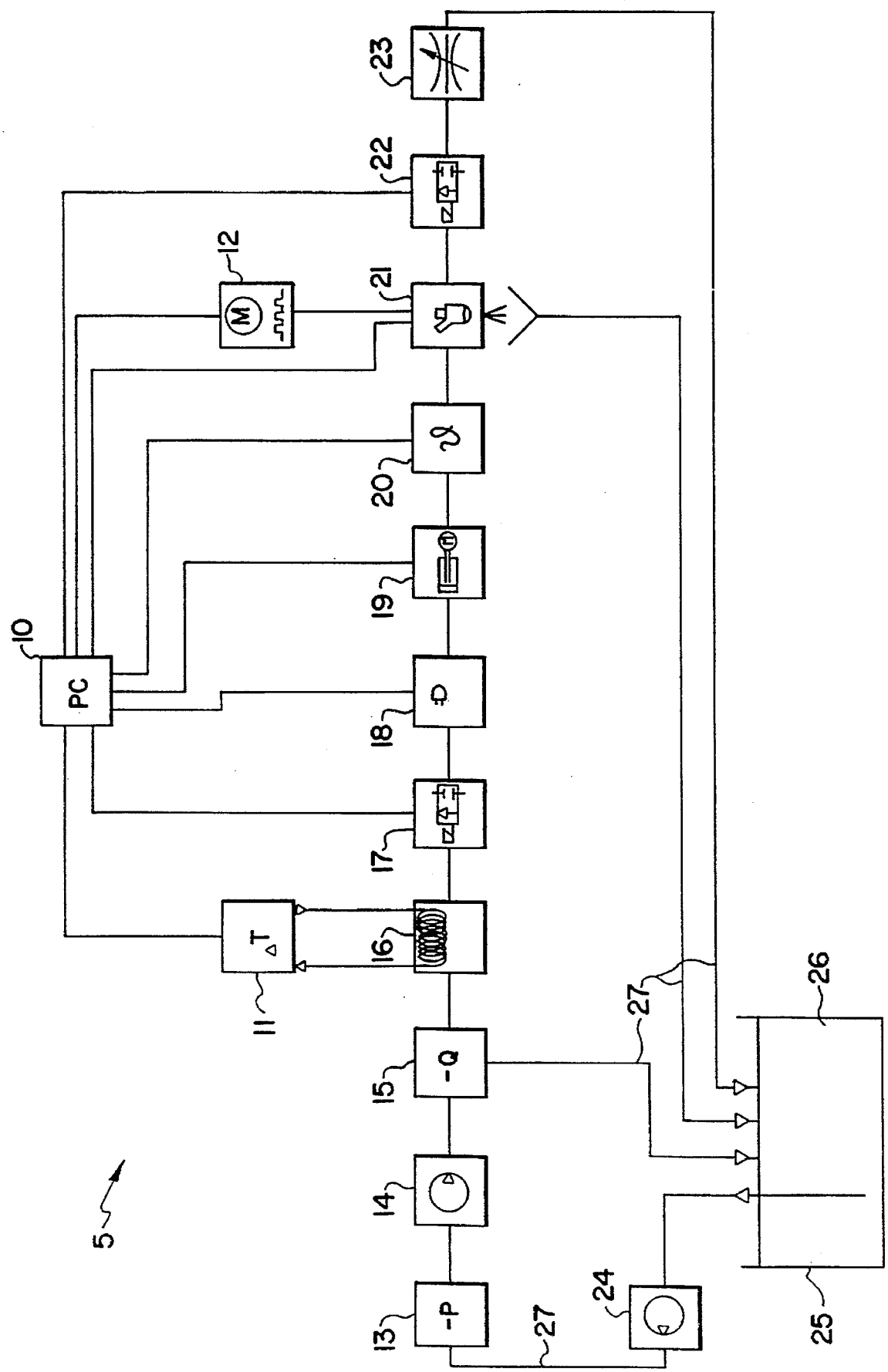

METHOD FOR SETTING AND CHECKING THE FLOW IN VALVES

TECHNICAL FIELD

The invention relates to a method for setting and checking the flow in valves, particularly in injection valves for internal combustion engines, where the valve is located in a measuring device and is subject to the action of a fluid with a predefined volume flow and in which the set pressure of the fluid in the measuring device is determined.

BACKGROUND ART

In engine technology injection valves are used for the precisely dosed supply of fuel. Particularly in the case of motor vehicles particularly high demands are made on injection valves with respect to a quantitatively very precise supply of the fuel, so as to obtain a very good and complete combustion of the fuel in the engine. This is more especially necessary in order to attain and maintain the strict requirements with respect to the exhaust values and engine efficiency.

In connection with the manufacture of injection valves it is known that at the end of the manufacturing process they are tested and precisely set with respect to the flow through them. For this purpose use is made of a measuring device, where the injection valve located therein is subject to the action of a test fluid under a specific pressure. In the measuring device the volume flow, also known as the through-flow or flow, is passed through the injection valve. The determined flow value is subsequently compared with the desired flow of the injection valve.

If a difference is detected between the actual and the desired value, the opening mechanism of the injection valve is adjusted in such a way that the opening time of the valve and consequently its flow is changed. The measuring cycle is then repeated and again a fluid under a constant pressure is passed through the valve and the flow which occurs is measured by a flow sensor. If a difference is still found between the actual and the desired value, the previously described setting and subsequent measuring process is repeated until the actual value reaches the desired value or at least a desired value range.

Generally between 60 and 80 seconds are required for setting an injection valve. Approximately 60 to 75% of the total testing, checking and setting process is taken up by the measurement and stabilization times.

An important reason for the/long measuring times is due to the flowmeters. Use is generally made of continuously measuring flowmeters on a volumetric meter basis, e.g. flow measuring turbines or geared pumps. With these measuring means the number of pulses corresponding to the flow quantity are summated by a suitable counter within a fixed time interval or gate time. Thus, a measured volume flow value is obtained, which can be defined as pulses per time unit. In order to obtain with such volumetric meters sufficiently accurate results, generally measuring times between 3 and 10 seconds per measuring process are required. The measuring times are a function of the flow quantity and the structure of the fluid circuit.

Such flowmeters have a relatively complicated construction and are expensive to buy. In addition, due to the integrated measuring process, it is not possible to detect unstable injection valves. Overall the conventional testing and setting procedure for injection valves is relatively time-consuming, the capacity of a measuring and setting device being limited to 40 to 60 injection valves per hour. This leads to correspondingly high plant costs for each injection valve. For the manufacture of large numbers a relatively large number of measuring devices is needed, which requires correspondingly high surface and investment costs.

DE 41 23 787 A1 discloses a fuel injection valve and a method for setting a fuel injection valve, the statically delivered fuel quantity supplied during the stationary open state of the fuel valve being set in that in a first method step on an already fitted fuel valve the actual quantity of the delivered fuel is measured with the fuel injection valve completely open and is compared with a predetermined desired quantity, whilst in a second method step the free flow cross-section of a restrictor is modified until the delivered actual quantity corresponds to the predetermined desired fuel value. This requires two time-succeeding working steps, in which in each case a volume is measured and in which the instantaneous volume flow and instantaneous pressure remain unknown.

DE 37 23 698 A1 discloses a method for the manufacture of a fuel injection valve, a component provided with several spraying openings in the form of a small plate being provided, in which the spraying openings are formed by erosion and the setting of the static flow quantity is carried out through the spraying openings by hydroabrading thereof, i.e. by scavenging said openings with a fluid abrasive medium. This method is performed once prior to the fitting of the valve and is unusable for valve setting purposes when the valve is being used in the engine.

De 33 28 044 A1 discloses a device for setting a plurality of injection units, particularly injection valves for multicylinder diesel engines. This known device is fitted at a corresponding point on the engine for the purpose of setting the injection valves and is removed again after setting an optimum basic setting. The quality of this basic setting is determined by establishing a smooth idling of the engine.

EP 5 09 455 A1 discloses a device for producing a precision fluid flow, particularly for testing injection valves. In this known device, which serves for the time-average quality control of injection valves, the liquid pressure is set in accurate and time-constant manner as a measured variable over the liquid flow. The setting of the valve or the corresponding quality control of the valve does not take place when the valve is fitted.

SUMMARY OF THE INVENTION

The object of the invention is to provide a method with which the flow in valves can be checked and/or set particularly accurately and with a relatively short time expenditure.

In the case of the method according to the invention this object is achieved in that a setting device on the valve is adjusted in accordance with the determined pressure value until the actual pressure corresponds to a desired pressure.

An injection valve in the measuring arrangement opposes the defined flow in the same way as a variable resistance increasing or decreasing the instantaneous fluid pressure as a function of the setting. The pressure change produced by the valve adjustment is obtained virtually with no delay. A divergence from the desired pressure can be very accurately determined by simply constructed and relatively inexpensive pressure sensors. As a result of the immediate response of the pressure signal the time required for setting purposes can be significantly reduced. As a pressure fluctuation is set with virtually no delay, it is also possible to detect and eliminate unstable valves during checking, testing or setting.

An advantageous further development of the method according to the invention comprises the set volume flow of the fluid corresponding to the desired valve flow. By adjusting a setting device provided on the injection valve in accordance with the instantaneously determined pressure value the fluid pressure can be modified by varying the valve opening. The volume flow remains constant throughout the measuring and setting process. By corresponding adjustment of the setting device it is therefore possible in a measuring cycle, i.e. during a single through-flow of the valve to set the pressure drop on said valve until a predetermined desired pressure is set. In this way the testing and setting time of the valve can be significantly reduced.

According to another embodiment of the invention it is advantageous that a measurement signal of the determined pressure value is used as a control signal for an adjusting device for adjusting the setting device on the valve. The adjusting device is operated in proportion to the determined pressure difference. A very short control loop is obtained, in which the desired value of the injection valve can be set with particular accuracy.

It is advantageous that the adjusting device is constituted by a stepping motor, an inductive or a capacitive adjusting member.

In another development of the invention it is advantageous that the setting device has a spring, whose bias is regulated by the adjusting device. The spring is a component of the injection valve. After modifying the spring tension, particularly the spring bias, the set spring bias is imposed in fixed manner on the injection valve. Thus, the injection valve is set in fixed manner to the desired flow.

An advantageous development of the invention comprises the spring of the adjusting device acting on the valve opening mechanism, an increase in the spring tension bringing about a lengthening of the opening time and a reduction of the flow. This permits a particularly reliable injection valve setting.

An advantageous development of the invention comprises that the spring is initially provided with an inadequate bias. The adjusting device in the measuring device can be designed in simple manner in such a way that it only brings about a tensioning of the spring. This leads to a particularly simply constructed and inexpensive measuring and setting device.

According to another embodiment of the invention it is advantageous for there to be a time variation of the fluid volume flow and that the set volume flow value is compared with the desired flow at the time at which the instantaneous pressure corresponds to the desired pressure. The volume flow represents a time-variable volume flow. By determining the time at which the desired pressure of the injection valve is reached, it is possible to establish the flow value in the injection valve. Therefore the device can also be used as a flowmeter for checking injection valves.

A further advantageous development of the invention comprises that in the case of a divergence of the volume flow value from the desired flow the setting device is adjusted in accordance with a predetermined adjustment function. The adjustment function indicates how the valve is to be adjusted at a determined pressure deviation in such a way as to obtain the desired pressure. The adjustment function is determined beforehand experimentally or theoretically for said injection valve and fed into a computer which, in accordance with the volume flow value deviation, adjusts the setting device. The adjustment function can in particular be the physical equation $Q = k p^{0.5}$, which approximately describes a link between the flow Q and the pressure p. The valve-dependent constant can be determined experimentally. Through the use of such an adjustment function, particularly in the case of small deviations from the desired value (+/−5%) in a measuring process an accurate valve setting can be performed.

An advantageous development of the invention comprises a defined volume flow being produced by a flow generator, which has a displacement piston and a stepping motor. A constant flow is produced by the piston driven by the stepping motor, which runs in a high precision cylinder. By the predetermination of a stepping frequency a piston speed is produced, which displaces the fluid located in the cylinder. The displaced quantity exactly corresponds to the desired flow of the injection valve to be set. For producing a time-variable flow the piston speed is correspondingly varied. The defined volume flow can be very accurately set.

According to another embodiment of the invention it is advantageous for the temperature of the fluid in the measuring device to be adjusted. Account is taken of the fact that the fluid pressure and volume change with the temperature. Through an accurate temperature setting, advantageously to a value corresponding to the normal operating temperature, the injection valve is particularly accurately set.

According to the invention gasoline is used as the fluid. Thus, in the measuring device a measurement condition is created, which comes particularly close to the injection valve operating conditions.

According to an advantageous development of the invention the flow generator, valve and a pressure sensor are functionally virtually rigidly interconnected, so that the valve is set with virtually no delay. The fluid between the flow generator, injection valve and pressure sensor is virtually volume-invariable. As a result of this rigid, functional coupling any pressure divergence caused by the valve adjustment takes place with substantially no delay. This permits a very accurate setting of the injection valve.

According to an advantageous development of the invention the fluid travels in a circuit, which creates a particularly fluid-economizing device.

In another development of the invention the determined measured values are advantageously processed by a computer, which is used for controlling operating means of the measuring device, particularly the adjusting device and flow generator. By means of a computer, particularly a PC, particularly rapid measurement data processing can be carried out.

DESCRIPTION OF A PREFERRED EMBODIMENT

The invention is described in greater detail hereinafter relative to an embodiment shown highly diagrammatically in a single drawing. The drawing shows a measuring device 5 according to the invention with a hydraulic circuit for setting injection valves 21 in the form of an elementary circuit diagram.

A pump 24 supplies a fluid 26, which is generally white spirit, from a tank 25 and via a pressure reducer 13 to a fuel pump 14, which produces the necessary pressure in the circuit. Excess white spirit is returned by a cut-off valve 15 to the tank 26. The fluid 26 required for setting purposes is stabilized in a counterflow heat exchanger 16. The heat exchanger 16 is supplied by a thermostatic bath 11, which is set by means of the control in a computer 10, e.g. a PC, to ambient temperature.

With the gate valves 17 and 22 open, there is a through-flow in the circuit and this is only limited by a restrictor 23. This setting is to be looked upon as the basic setting of the circuit, at which a flow generator 19 is filled. With the beginning of the setting of the injection valve 21 the gate valves 17 and 22 are closed and simultaneously the flow generator 19 is switched on. This generates a constant volume flow, which is imposed on the injection valve 21 to be set and which corresponds to the desired flow to be set. The flow is produced by a piston driven by a stepping motor containing a cylinder filled with the test fluid 26. With the geometrical dimensions of the piston it is possible to calculate the piston speed required for generating the desired flow. This speed is predetermined for the stepping motor of the flow generator 19 and it maintains the same with an adequately good synchronism. The stepping motor has in particular a synchronous motor characteristic, so that a constant volume flow is produced. Through additional valves the piston can also be operated in reverse, i.e. one side of the piston is emptied, whilst the other is simultaneously filled.

The valve 21 to be set, which normally enters the measuring and setting device 5 with an inadequately tensioned spring, has a flow above the volume flow, so that a reduction of the working pressure is obtained. This working pressure reduction is detected by a pressure sensor 18 and read by the computer 10. This measured value is used as the initial value for the calculation of the stepping frequency for the stepping motor 12, which biases the spring in the injection valve 21. The modified spring tension leads to a change in the flow and therefore a change in the pressure. These changes are read by the computer 10 and converted into stepping frequencies until the pressure is within a very close tolerance range with respect to the desired pressure. On reaching the tolerance limits the injection valve 21 can be notched.

After notching the hydraulic circuit, which has several fluid lines 27, can again be brought into the basic position, so that the flow generator can again be filled.

After notching the flow generator 19 can be used for checking the valve setting. The flow generator 19 is operated at a variable speed and the piston speed is modified until the desired pressure value is set on the pressure sensor 18. If at this time the flow generator 19 produces the desired flow, then the injection valve 21 is correctly set.

For checking the measuring and setting device 5, e.g. with respect to the high demands made by DIN/ISO 9000, it is additionally possible to use a high precision flowmeter for calibrating and testing the device 5.

As a result of the method according to the invention it has been possible to considerably reduce the time needed for setting injection valves. This means a significant cost saving when installing production plant by reducing the number of setting devices and the use of simpler, more accurate pressure sensors in place of conventional flowmeters.

What is claimed is:

1. A method for setting and checking a flow in the case of valves comprising the steps of:
    placing a valve in a measuring device,
    subjecting the valve to the action of a fluid at a predefined volume flow,
    determining the pressure of the fluid in the measuring device, and
    adjusting a setting device on the valve in accordance with the determined pressure value until an actual pressure corresponds to a desired pressure.

2. Method according to claim 1, wherein the volume flow of the fluid corresponds to a desired flow of the valve.

3. Method according to claim 2, wherein a measurement signal of the determined pressure value is used as a control signal for an adjusting device for adjusting the setting device on the valve.

4. Method according to claim 3, wherein a stepping motor is used as the adjusting device.

5. Method according to claim 3, wherein an inductive adjusting member is used as the adjusting device.

6. Method according to claim 3, wherein a capacitive adjusting member is used as the adjusting device.

7. Method according to claim 3, wherein the setting device has a spring, whose pretension or bias is regulated by the adjusting device.

8. Method according to claim 7, wherein the spring of the setting device acts on an opening mechanism, an increase in the spring tension bringing about an increase in the opening time and a reduction of the flow.

9. Method according to claim 7, wherein the spring is initially provided with an inadequate bias.

10. Method according to claim 2, wherein in the case of a divergence of the volume flow value from the desired flow the setting device is adjusted in accordance with a predetermined adjustment function.

11. Method according to claim 1, wherein the volume flow of the fluid is time-modified and the set volume flow value is compared with a desired flow at a time at which the instantaneous actual pressure corresponds to the desired pressure.

12. Method according to claim 1, wherein the defined volume flow is produced by a flow generator, which has a displacement piston and a stepping motor.

13. Method according to claim 12, wherein the flow generator, valve and a pressure sensor are functionally virtually rigidly interconnected, so that the valve is set with virtually no delay.

14. Method according to claim 12, wherein the determined measured values are processed by a computer, which is used for controlling operating means of the measuring device, the adjusting device and the flow generator.

15. Method according to claim 1, wherein a temperature of the fluid is set in the measuring device.

16. Method according to claim 1, wherein gasoline is used as the fluid.

17. Method according to claim 1, wherein the fluid travels in a circuit.

18. A method for setting and checking a flow in injection valves for internal combustion engines comprising the steps of:
    placing a valve in a measuring device,
    subjecting the valve to the action of a fluid at a predefined volume flow,
    determining a setting pressure of the fluid in the measuring device, and
    adjusting a setting device on the valve corresponding to the determined pressure value until an actual pressure corresponds to a desired pressure.

19. Method according to claim 18, wherein the volume flow of the fluid corresponds to a desired flow of the valve.

20. Method according to claim 19, wherein a measurement signal of the determined pressure value is used as a control signal for an adjusting device for adjusting the setting device on the valve.

21. Method according to claim 20, wherein a stepping motor is used as the adjusting device.

22. Method according to claim 20, wherein an inductive adjusting member is used as the adjusting device.

23. Method according to claims 20, wherein a capacitive adjusting member is used as the adjusting device.

24. Method according to claim 20, wherein the setting device has a spring, whose pretension or bias is regulated by the adjusting device.

25. Method according to claim 24, wherein the spring of the setting device acts on an opening mechanism, an increase in the spring tension bringing about an increase in the opening time and a reduction of the flow.

26. Method according to claim 24, wherein the spring is initially provided with an inadequate bias.

27. Method according to claim 19, wherein in the case of a divergence of the volume flow from the desired flow the setting device is adjusted in accordance with a predetermined adjustment function.

28. Method according to claim 18, wherein the volume flow of the fluid is time-modified and the set volume flow value is compared with a desired flow at a time at which the instantaneous actual pressure corresponds to the desired pressure.

29. Method according to claim 18, wherein the defined volume flow is produced by a flow generator, which has a displacement piston and a stepping motor.

30. Method according to claim 29, wherein the flow generator, valve and a pressure sensor are functionally virtually rigidly interconnected, so that the valve is set with virtually no delay.

31. Method according to claim 29, wherein the determined measured values are processed by a computer, which is used for controlling operating means of the measuring device, the adjusting device and the flow generator.

32. Method according to claim 18, wherein a temperature of the fluid is set in the measuring device.

33. Method according to claim 18, wherein gasoline is used as the fluid.

34. Method according to claim 18, wherein the fluid travels in a circuit.

* * * * *